Figure 1:
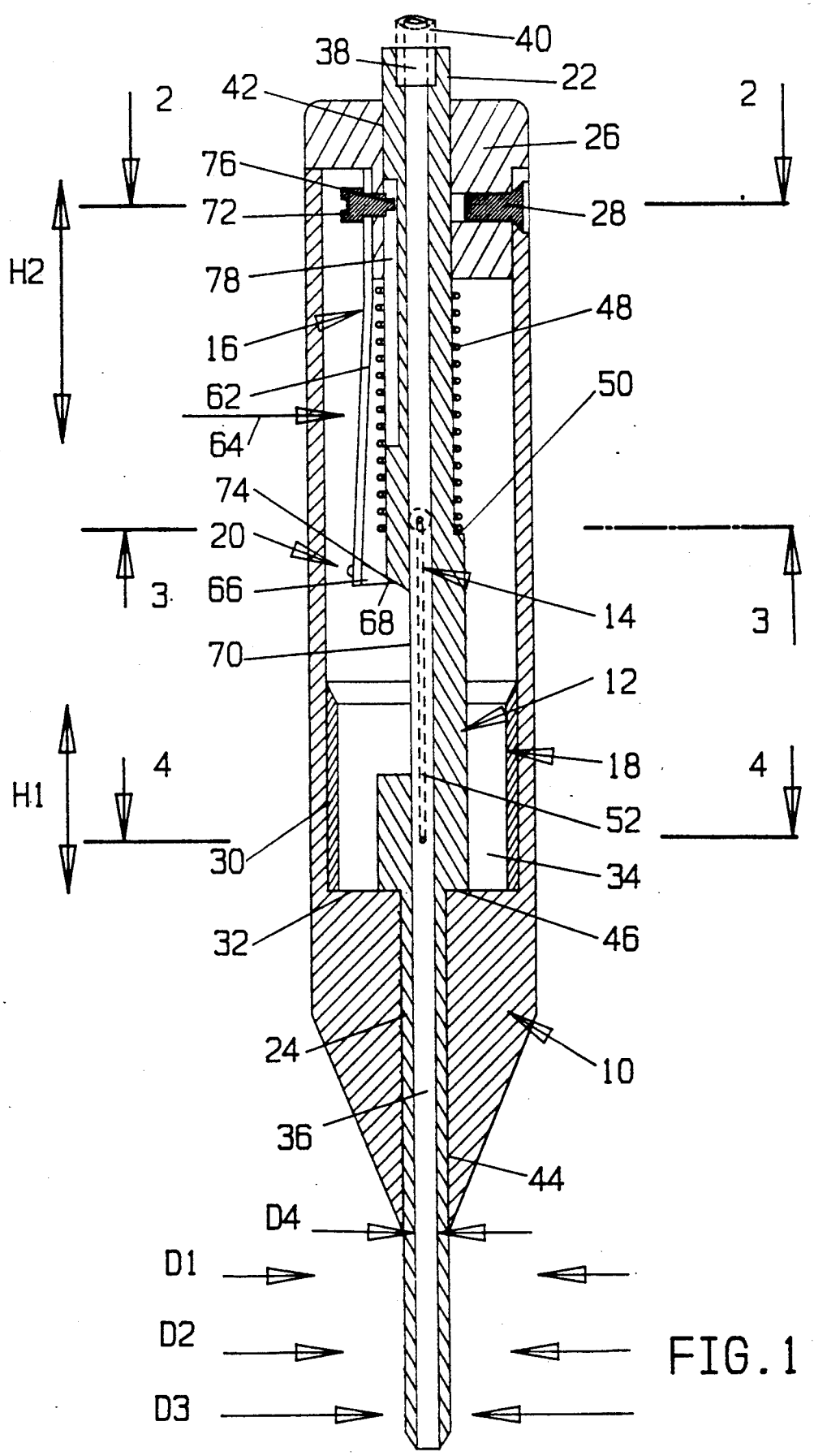

United States Patent [19]

Michelena

[11] Patent Number: 5,190,187
[45] Date of Patent: Mar. 2, 1993

[54] DEVICE FOR THE DISPENSING OF SPRINGS

[75] Inventor: Jean-Marie Michelena, Limoges, France

[73] Assignee: Societe Technique d'Automatismes et d'Ensembles A Ressorts - S.T.A.E.R., Limoges, France

[21] Appl. No.: 789,840

[22] Filed: Nov. 12, 1991

[30] Foreign Application Priority Data

Nov. 13, 1990 [FR] France ............................ 90 14077

[51] Int. Cl.$^5$ ............................................. B65G 59/00
[52] U.S. Cl. .................................. 221/186; 221/298; 221/190
[58] Field of Search .................. 221/40, 298, 289, 190, 221/186

[56] References Cited

U.S. PATENT DOCUMENTS

| | | | |
|---|---|---|---|
| 2,901,146 | 8/1959 | Powell et al. | 221/298 |
| 2,906,011 | 9/1959 | Focht . | |
| 2,993,397 | 7/1961 | Albertson et al. . | |
| 3,193,136 | 7/1965 | Stumpf et al. | 221/40 |
| 4,120,392 | 10/1978 | Sturm | 221/298 |
| 4,653,668 | 3/1987 | Gibilisco et al. | 221/298 |
| 4,792,035 | 12/1988 | Turner et al. | 221/298 |

Primary Examiner—H. Grant Skaggs
Attorney, Agent, or Firm—Sughrue, Mion, Zinn, Macpeak & Seas

[57] ABSTRACT

Device for the dispensing of springs in at least one unit, comprising a spring-feed device of the type with a flexible tube, within which the springs are arranged behind one another, in contact and coaxially with a flexible tube, and a tubular dispensing body which includes two coaxial tubes (10, 12), the inner tube (12) being mounted telescopically relative to the other tube (10), a connection (38) between the feed device (40) and the inner tube (12), and first and second mechanisms (14 and 16) for blocking the first and second mechanisms (18 and 20) for unblocking the first and the second springs (R1, R2) contained in the inner tube (12), these blocking and unblocking mechanisms (14, 16, 18, 20) being controlled by the relative displacement of the outer tube (10) in relation to the inner tube (12), in such a way that the first spring (R1) is compressed by the first blocking mechanism (14), before being released by the first unblocking mechanism (18).

10 Claims, 2 Drawing Sheets

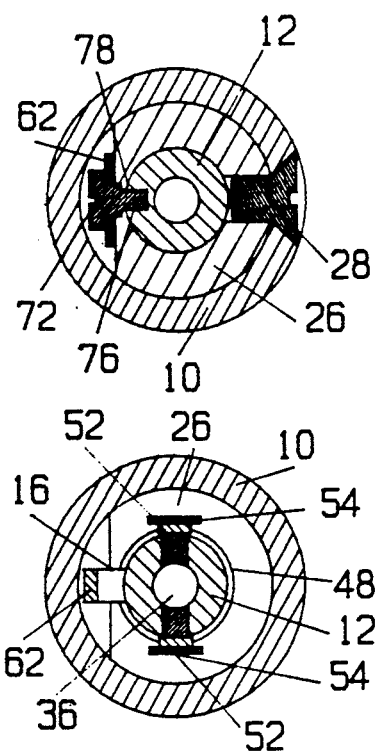
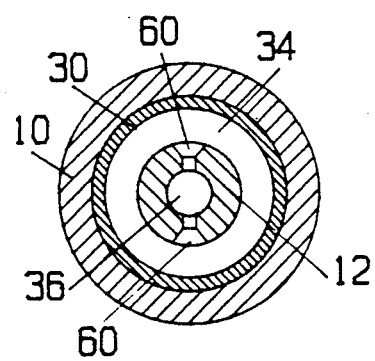
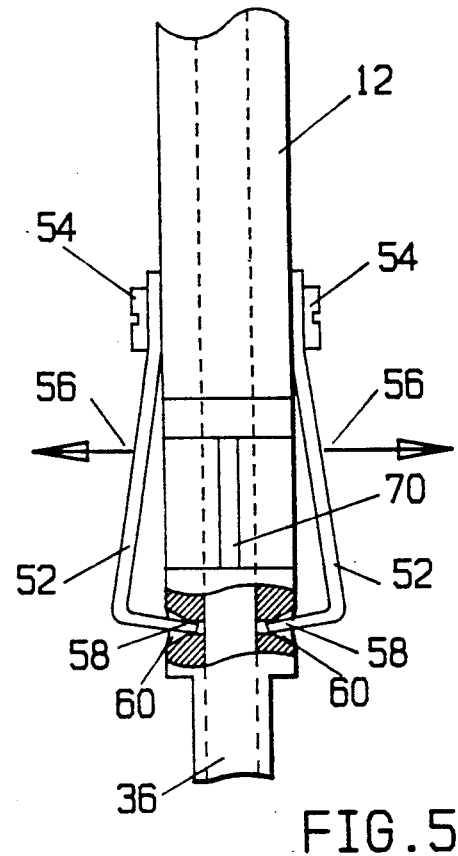
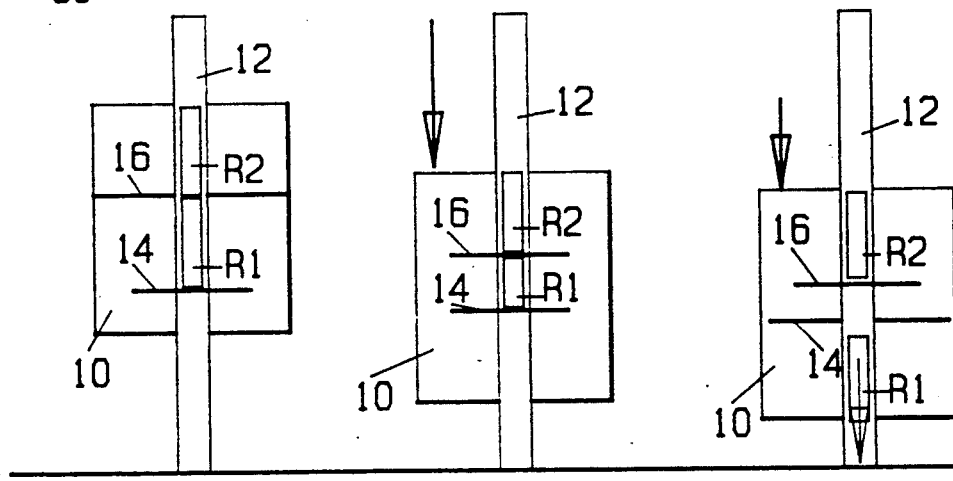

DEVICE FOR THE DISPENSING OF SPRINGS

The subject of the present invention is a device for the dispensing of springs.

Many sectors of industry use springs of very small diameter, especially helical springs, the dimensions, diameter and length of which are of the order of millimeters.

There are two means for producing these springs. The first involves employing a machine for manufacturing the springs, placing these springs in vibratory bowls which separate them with greater or lesser difficulty and in more or less time, and then introducing them into flexible tubes having an inside diameter compatible with the outside diameter of the spring. These tubes have a predetermined length and constitute refills which ensure storage and which are supplied to the users of these springs.

The second means for producing springs of very small diameter involves arranging a spring-making machine directly on the user's premises and in the immediate vicinity of the assembly station employing such springs. Such a machine of small overall size expels the manufactured springs one after the other directly into a flexible feed tube, one end of which is fastened to the spring-making machine and the free end of which opens directly into the station for installing these springs.

The displacement of the springs in the tubes is obtained by vibration or by the circulation of compressed air within the tube, the result of this being that the end turns of the springs are adjacent to one another, the helical springs being coaxial with the flexible tube.

At the end of the tube, whether a direct feed or an intermittent feed with flexible-tube refills is concerned, it is necessary to enable the user to grasp a spring and put it in place in the component which is to receive it.

At the present time, the positioning and putting in place are carried out manually by means of grippers with two branches of the tweezer type. It will be appreciated that this means is unsuitable when the aim is to have high outputs and high reliability. Moreover, for the user to operate the gripper, it is necessary for him to execute a large number of movements of the hand and fingers which can lead to serious physical problems.

There are devices making it possible to dispense springs one by one, which are connected to the flexible feed tubes and which involve blocking the gravity flow of all the springs in the tube while at the same time the last spring is being released.

Thus, in theory, the last spring descends, whereas the others remain blocked in the flexible tube. Such a device has the disadvantage of utilizing gravity alone to cause the released spring to descend, the result of this being that, as soon as the last spring is not positioned perfectly, it does not descend and the device has to be shaken in order to allow this spring to fall.

Another disadvantage of this dispensing device is that it utilizes gravity and therefore makes it possible to put springs in place only in the direction in which this gravity is exerted, that is to say in the vertical direction from top to bottom, and it is very difficult, even impossible, to offer such springs into inclined receptacles or indeed in the opposite direction to that of gravity.

Furthermore, industry requires simple and reliable devices which employ only few components and which are of a cost price compatible with the function which they perform, thus excluding all devices of the screw or cam type, motorized or supplied from an energy source, for example of the electrical or compressed-air type.

The present invention provides a spring-dispensing device which is simple, reliable and inexpensive, which is light and ergonomic, which is completely manual, the manipulation of which is simple, which makes it possible to put springs into place, whatever the orientation of the receptacle, and which can be fed continuously by a flexible tube coming from a spring-making machine or intermittently from refills.

To this effect, the device for dispensing springs in at least one unit comprises spring-feed means of the type with a flexible tube, within which the springs are arranged behind one another, in contact and coaxially with the flexible tube, and a tubular dispensing body, and this dispensing device is characterized in that the tubular body comprises two coaxial tubes, the inner tube being mounted telescopically relative to the outer tube, a connection between the flexible feed tube and the inner tube, and first and second means for blocking and first and second means for unblocking the first and the second spring contained in the inner tube, these blocking and unblocking means being controlled by the relative displacement of the outer tube in relation to the inner tube, in such a way that the first spring R1 is compressed by the first blocking means, before being released by the first unblocking means.

According to a particular characteristic of the invention, the first and second blocking means each comprise at least one movable element returned elastically outwards and inwards respectively and fixed to the inner tube and to the outer tube respectively.

According to a particular embodiment, each elastically returned movable element comprises at least one spring leaf fastened to the outer wall of the inner tube in respect of the first blocking means and fastened to the inside of the wall of the outer tube in respect of the second blocking means.

The inner and outer tubes of the dispensing device according to the invention comprise slots provided for the passage of the blocking means.

Moreover, the first and second unblocking means are carried respectively by the outer and inner tubes.

According to a particular embodiment, the first and second unblocking means each consist of a receptacle made respectively in the inner wall of the outer tube and in the inner tube itself.

Furthermore, the first unblocking means are arranged above the end of the first spring, in such a way that the first blocking means compress the latter before releasing it.

In addition, the device according to the invention comprises means for blocking the rotation of the inner tube relative to the outer tube.

An elastic return element is likewise interposed between the inner and outer tubes.

According to a particular embodiment, the inner tube is of a length greater than that of the outer tube, so that the inner tube projects above and below the outer tube between two stops, whatever the dispensing phase.

The present invention is described hereafter according to a particular embodiment with reference to the accompanying drawings in which:

FIG. 1 shows a view in longitudinal section of the dispensing device according to the invention, FIG. 2 shows a cross-sectional view along the line 2—2 of FIG. 1, FIG. 3 shows a cross-sectional view along the line 3—3 of FIG. 1, FIG. 4 shows a view along the line 4—4 of FIG. 1, FIG. 5 shows a view in partial longitudinal section in a plane perpendicular to the sectional plane of FIG. 1, this section being seen in the direction of the arrow A and being enlarged, and FIGS. 6A to 6C show three operating phases of the device.

FIG. 1 illustrates the dispensing device according to the invention, which comprises an outer tube 10, an inner tube 12, first and second blocking means 14 and 16 and first and second unblocking means 18 and 20.

The two inner and outer tubes 10 and 12 are mounted telescopically relative to one another, and the length of the inner tube is such that it projects from the outer tube 10 at its upper end 22 and at its lower end 24. This outer tube 10 comprises a plug 26 making it possible to mount the inner tube 12. This plug 26 is immobilized relative to the outer tube 10 by means of a screw 28 perpendicular to the longitudinal axis of the device.

The outer tube 10 also comprises a sleeve 30 of height H1, arranged inside the outer tube in its lower part, immediately above an extra-width bore 32 made in this outer tube 10. This sleeve 30 reduces the diameter of the extra-width bore 32. The diameter of the extra-width bore 32 is designated by D1, the diameter of the extra-width bore reduced by the sleeve 30 by D2 and the outside diameter of the inner tube 12 by D3.

The diameter D3 of the inner tube 12 is smaller than the diameter D2 delimited by the sleeve 30, so as to leave a free annular zone 34.

The inner tube 12 comprises a central channel 36, the diameter of which is designated by D4 and which extends over the entire height of this tube. At the upper end 22, an extra-width bore 38 makes it possible to connect a flexible feed tube 40 represented by dot-and-dash lines. The tube 12 is mounted telescopically relative to the outer tube 10 and slides through the plug 26 by way of a bore 42 and, in relation to the outer tube 10 itself, through a bore 44 made at its lower end. This bore 44 is of a diameter between D4, the diameter of the channel 36 of the inner tube 12, and D3, which is the outside diameter of this inner tube 12, in such a way that this inner tube 12 comes into abutment on the extra-width bore 32 at the contact point designated by 46.

The inner tube 12 is returned elastically in such a way that it comes into abutment at the contact point 46. This elastic return is obtained by means of a spring 48 interposed between the plug 26 and the inner tube 12, this spring 48 coming to bear on a stop 50 formed in the outer wall of the inner tube 12.

The first blocking means 14 is shown in detail in FIG. 5 and comprises two spring leaves 52 diametrically opposed and oriented perpendicularly to the sectional plane of FIG. 1. These spring leaves are fastened to the inner tube 12 by means of screws 54, and they are shaped so as to move away from this tube 12 according to the arrows 56.

Moreover, the end 58 of each leaf 52 is curved substantially at right angles so as to be capable of being introduced through bores 60 made in the tube 12 and opening out inside the inner tube 12 into the channel 36.

The second blocking means 16, illustrated in FIG. 1, comprise a spring leaf 62 shaped so as to exert a return force according to the arrow 64, that is to say from the outside of the outer tube towards its inside. Fastened to the lower end of this leaf 62 is a cam 66 of oblique slope 68, the thickness of this cam 66 being sufficient to project into the tube through a slot 70 which is made on the outer periphery of the inner tube 12 and which can be seen in FIGS. 1 and 5.

Furthermore, the upper end of the spring leaf 62 is fastened to the plug 26 by means of a screw 72. The slot 70 is machined in its upper part and comprises an inclined plane 74 which interacts with the profile of the cam 66. This inclined plane 74 constitutes the second unblocking means 20.

In addition, the screw 72 for fastening the spring leaf 62 to the plug 26 is provided with a needle-shaped end 76 which projects into the bore 42 made in the plug 26, so as to penetrate into a groove 78 formed in the inner tube 12 over a height H2. In FIGS. 2, 3 and 4, identical elements bear the same references. There are thus, once again, the outer tube 10, the plug 26, a screw 28 for blocking the plug 26 relative to the outer tube 10, and the screw 72 ensuring the blocking of the spring leaf 62 relative to this plug 26, as well as the end of the screw forming a needle 76 and sliding in the groove 78 formed in the inner tube 12.

FIG. 3 likewise shows once again the outer tube 10, the plug 26, the spring leaf 62, as well as the two spring leaves 52 of the first blocking means with the fastening screws 54, the inner tube 12 and its central channel 36 and the spring 48 interposed between the inner tube 12 and the plug 26.

The sectional view of FIG. 4 likewise shows once more the outer tube 10, the inner sleeve 30, the annular zone 34, the inner tube 12, and the bores 60 made in the inner tube 12 and opening into the central channel 36.

As regards FIGS. 6A to 6C, these show block diagrams of the three essential operating phases of the dispensing device according to the invention.

The dispensing device according to the invention is assembled in the following way.

The outer tube 10 is equipped with its inner sleeve 30. The inner tube 12 receives the spring 48 mounted coaxially with this tube, and then the plug 26 is mounted on the tube 12 by means of the bore 42, until the spring 48 is compressed to ensure that the plug comes substantially into line with the groove 78. The spring leaf 62 equipped with its cam 66 is then fastened to the plug by means of the screw 72, the end of which penetrates, during screwing, into the groove 78 after the plug has been oriented relative to the inner tube 12. The cam 66 is thus in line with the slot 70, and the plug is fixed in terms of rotation relative to the inner tube 12, the latter being capable of executing a relative movement in relation to the plug over the travel H2 corresponding to the height of the groove 78.

This assembly is introduced into the outer tube 10, until the plug 26, of which the diameter of the part penetrating into the tube of the outer part corresponds to the diameter D1 of the outer tube 10, comes to bear on the upper end of the tube 10, and it is oriented in such a way that the screw 28 can be put in place, thereby ensuring that the plug is blocked relative to the outer tube 10.

Once assembled, it is found that the inner and outer tubes can slide relative to one another as a result of this telescopic assembly, with a maximum movement corresponding to the height H2 of the groove 78, and that the inner tube 12 is blocked in terms of rotation relative to the outer tube 10 by means of the plug 26.

The operation of the dispensing device according to the invention is described hereafter with reference to FIGS. 6A to 6C which show a highly simplified block diagram of this operation.

This operation is also described with reference to FIGS. 1 to 5 which illustrate in detail the various components which will be listed.

Once the dispenser is assembled, as mentioned above, it is appropriate to connect it to a flexible spring-feed tube 40. This flexible tube of known type interacts with the extra-width bore 38 of the inner tube 12, in such a way that the springs can travel through the flexible tube 40 into the central channel 36 in its upper part. To assist this travel, and in a known way, there is provided a circulation of compressed air through this flexible tube 40, this air being discharged outwards by way of the channel 36 of the inner tube 12. The springs accumulate as far as the first blocking means 14. These first blocking means comprise the two spring leaves 52 way that the ends 58 of these leaves pass through the bores 60 and, by projecting, penetrate into the channel 36. These spring leaves are compressed by the sleeve 30 because the inside diameter D2 is smaller than the diameter D1 corresponding substantially to the maximum spacing between the two spring leaves 52.

Thus, FIG. 6A shows diagrammatically the two ends 58 of the springs 52 which project into the channel 36 and which block the first spring R1.

At the same time, the cam 66 is outside the channel 36 because the inclined plane 74 interacts with the slope 68 of the cam 66 so as to shift this cam out of the channel 36 counter to the return force exerted by the spring leaf 62 in the direction of the arrow 64. The return spring 48 lays the tube 12 onto the extra-width bore 32 at the contact point 46. This position is a stable position before dispensing.

When the user wants to put a spring in place by means of the dispensing device according to the invention, he grasps the outer tube 10 and presses the lower end 24 of the inner tube 12 down at the location where he wishes to deposit the spring R1. Once the device has been put in place, he exerts pressure on the outer tube 10 in the longitudinal direction, so that the latter slides about the tube 12 in order to assume the position shown diagrammatically in FIG. 6B.

During this displacement, the spring leaves 52 of the first blocking device continue to hold the spring R1, whilst the sleeve 30 is displaced downwards, the user exerting a force which opposes the return force exerted by the spring 48, and in parallel with this the cam 66, under the return force exerted by the leaf 62, penetrates into the channel 36 through the slot 70 and blocks the spring R2 located immediately above the spring R1. The spring R1 is compressed as a result of the relative displacement of the spring leaves 52 and of the sleeve 30, and the ends 58 hold them until the outer tube 10 is displaced relative to the inner tube 12 over a height H1, for as soon as this displacement is greater than H1 the spring leaves 52 move away in contact with the bevel of the sleeve 30, whilst the cam 66 projects to a greater extent into the channel 36, completely blocking the spring R2. When the user continues his movement until the displacement of the outer tube 10 relative to the inner tube 12 is equal to H2, greater than H1, the ends 58 of the spring leaves 52 move away and no longer project into the channel 36, no longer ensuring the blocking of the spring R1 which, after being compressed during the entire displacement corresponding to H1, is released. By means of its own return force, it is ejected out of the dispensing device by way of the channel 36.

This ejection is represented diagrammatically in FIG. 6C, in which the unblocking means 18 have ensured the release of the spring R1, whilst the second blocking means 16 have ensured the retention of the spring R2.

When the user relaxes the pressure which he exerts on the outer tube 10, the latter is returned upwards relative to the tube 12 by means of the return spring 48, and simultaneously the unblocking means 20, by the agency of the slope 74 interacting with the inclined plane 68 of the cam 66, allow the retraction of this cam and the release of the spring R2, whilst the ends 58 of the spring leaves 52 project into the channel 36 because they are compressed by the outer sleeve 30. The spring R2, released by the unblocking means 20, descends within the channel 36 until it comes into abutment on the ends 58 of the spring leaves 52 of the first blocking means, that is to say the dispensing device resumes the position shown in FIG. 6A after a complete cycle of the dispensing device according to the invention.

The detailed embodiment just described is the preferred embodiment of the invention, but alternative versions employing equivalent means can be produced, without thereby departing from the scope of the invention.

I claim:

1. Device for the dispensing of springs in at least one unit, comprising spring-feed means of the type with a flexible tube, within which the springs are arranged behind one another, in contact and coaxially with the flexible tube, and a tubular dispensing body, characterized in that the tubular body comprises two coaxial tubes (10, 12), the inner tube (12) being mounted telescopically relative to the outer tube (10), a connection (38) between the feed means (40) and the inner tube (12), first and second blocking means (14 and 16) for blocking a first and a second spring (R1, R2) contained in the inner tube (12), and first and second unblocking means (18 and 20) for unblocking said first and second blocking means (14, 16) in order to release the first and second springs, said blocking and unblocking means (14, 16, 18, 20) being controlled by a relative displacement of the outer tube (10) in relation to the inner tube (12), in such a way that the first spring (R1) is compressed by the displacement of the first blocking means (14), before being released by the first unblocking means (18).

2. Dispensing device according to claim 1, characterized in that the first and second blocking means (14 and 16) each comprise at least one movable return element (52, 62) returned elastically outwards and inwards respectively and fixed to the inner tube (12) and to the outer tube (10) respectively.

3. Dispensing device according to claim 2, characterised in that each return element comprises at least one spring leaf (52, 62) fastened to the outer wall of the inner tube (12) in respect of the first blocking means (14) and fastened to the inside of the wall of the outer tube (10) in respect of the second blocking means (16).

4. Dispensing device according to claim 1, 2 or 3, characterized in that the outer (10) and inner (12) tubes comprise slots (60 and 70) provided for the passage of the blocking means (14 and 16).

5. Dispensing device according to claim 4, characterized in that the first and second unblocking means (18 and 20) are carried respectively by the outer (10) and inner (12) tubes.

6. Dispensing device according to claim 5, characterised in that there is coaxially disposed inside the outer tube (10) a sleeve (30) having an inner diameter (D2) and an outer diameter which is identical to the inner diameter of the outer tube (10), and in that the first unblocking means (18) consists of a gap formed between said inner diameter (D2) and said outer diameter of the sleeve (30).

7. Dispensing device according to claim 1, characterised in that the first unblocking means (18) are arranged above the end of the first spring (R1), in such a way that the displacement of the first blocking means (14) compresses the first spring (R1) before releasing it.

8. Dispensing device according to claim 1, characterized in that it comprises means (76 and 78) for blocking rotation of the inner tube (12) relative to the outer tube (10).

9. Dispensing device according to claim 8, characterized in that an elastic return element (48) is interposed between the inner and outer tubes.

10. Dispensing device according to claim 1, characterized in that the inner tube (12) is of a length greater than that of the outer tube (10), so that the inner tube (12) projects below and above the outer tube (10) between two stops (46 and 50), whatever the dispensing phase.

* * * * *